March 27, 1951          C. NICOLLE          2,546,698
SHEET MATERIAL WITH WEAKENED TEARING LINE
Filed Dec. 26, 1945
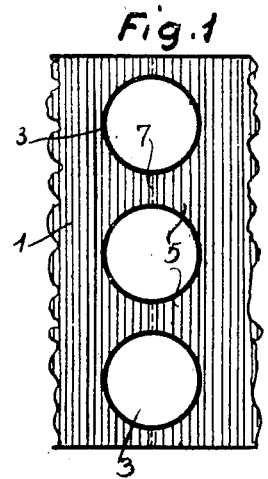
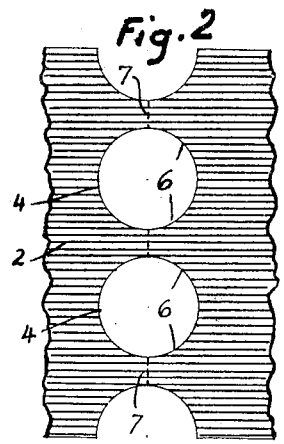
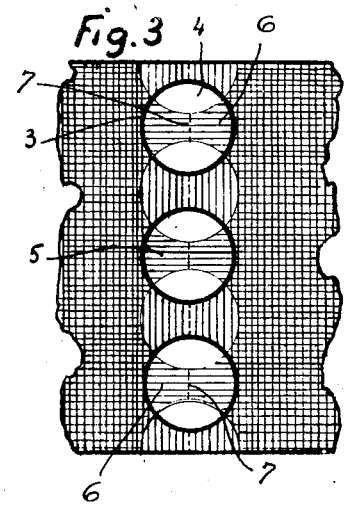
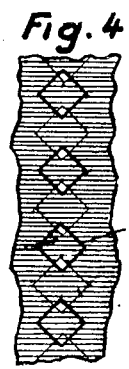
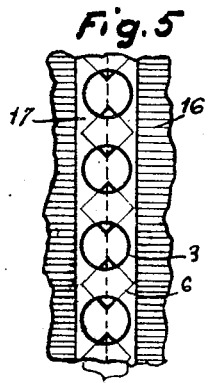
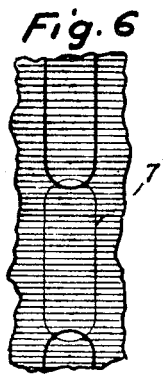
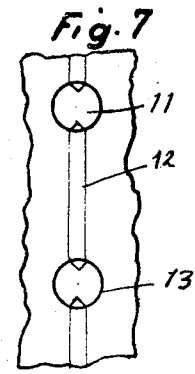
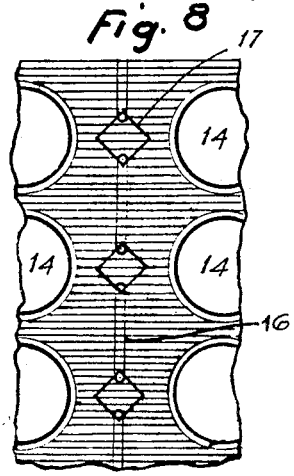
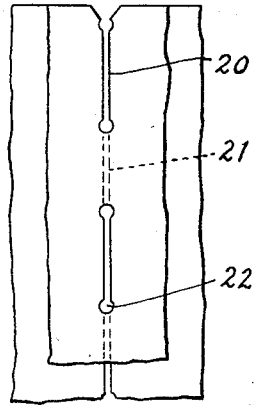
INVENTOR
Charles Nicolle
By Watson, Cole, Grindle & Watson Patented Mar. 27, 1951

2,546,698

UNITED STATES PATENT OFFICE 2,546,698

SHEET MATERIAL WITH WEAKENED TEARING LINE

Charles Nicolle, Gentilly, France

Application December 26, 1945, Serial No. 637,262
In France October 20, 1943

Section 1, Public Law 690, August 8, 1946
Patent expires October 20, 1963

4 Claims. (Cl. 229—66)

This invention relates to packages wherein products are confined between superposed layers of suitable sheet material with portions of such layers bonded together to confine the products in a space or spaces provided therefor between such layers. The invention has particular application to the production of multiple packages wherein a plurality of separate spaces or cavities are formed between two superposed sheets.

In order to facilitate the tearing of the material between individual cavities or groups of cavities it has been common to provide lines of perforations extending through the superposed layers of sheet material so as to reduce the resistance to tearing.

When the material used to make the wrappers is a cellulose acetate base or a plastic substance of similar tensile strength, tearing along the lines of perforations still is difficult even if the sheets of plastic substance are very thin, for the cementing together of two sheets of cellulose acetate not only imparts to the assembly a resistance corresponding to the sum of the resistances which each individual sheet would have, but beyond this an additional resistance due to the cementing, which resistance is further increased if the sheets are corrugated in their cemented portions.

The resistance which the sheets oppose to tearing along the lines of perforation is particularly undesirable in multiple packages of plastic material containing fragile products, which might be crushed if too great a force has to be applied to open or separate the package units by tearing. Such an increased effort may also lead to an involuntary tearing of unperforated parts of the sheet in directions other than that defined by the line of perforations, especially since cracks are frequently formed at the edges of the perforations and these make it easy to accidentally tear the unperforated parts.

These drawbacks are obviated, according to the present invention, by reducing the tear resistance of the double layer of the sheet material along the perforated lines by staggering the perforations in the two superposed layers so that narrow sections of the material (the bridging sections) between adjoining perforations of one sheet register with the perforations of the other sheet. Furthermore, the perforations in one sheet are made at least as long as the bridging sections of the other sheet. Obviously this modification of the conventional arrangement of mutually registering perforations in both sheets brings about at least a fifty percent reduction of the tearing resistance along the perforated lines, because now those sections which must be torn (the bridging sections) only possess the thickness of one sheet.

In the attached drawing various embodiments of the invention are shown diagrammatically as examples.

In the drawing:

Figures 1 and 2 show parts of the two sheets in the position in which the sheet of Fig. 1 will be placed on the sheet of Fig. 2.

Fig. 3 shows the united sheets.

Fig. 4 illustrates a perforated section of a double sheet formed with square perforations.

Fig. 5 is a double sheet with square perforations in one, and circular perforations in the other sheet, the perforated sections of the sheets being not cemented together.

Fig. 6 shows part of a double sheet with staggered elongated perforations.

Fig. 7 a double sheet with circular perforations in one and narrow slits in the other sheet.

In Fig. 8 part of multiple wrapper is shown with a weakened tearing line formed of square perforations in one and narrow slits in the other sheet staggered relative to each other. In the embodiment of Fig. 9 the perforations are narrow slits of knife-edge width.

Referring to the drawings, Fig. 1 shows a portion of sheet 1 with perforations 3, Fig. 2 a portion of sheet 2 with perforations 4, in the position, in which the two portions are superposed and glued together. The finished double-sheet portion appears in Fig. 3. The two sheets have been hatched differently in order to be easily distinguished. Fig. 3 shows the bridging sections 5 of sheet 1 as crossing the perforations 4 of sheet 2, while the bridging sections 6 of sheet 2 cross the perforations 3 of sheet 1. The tearing line which extends across the narrowest part of each bridging section, is indicated in dotted lines at 7.

Obviously, since the bridging sections of the two sheets are not arranged in superposition and their narrowest portions are not glued together, they do no longer reinforce each other, but are torn singly and offer no greater resistance to tearing than the same sections in a single sheet.

In Fig. 4 square perforations 8, 9 are arranged with their bridging sections of one sheet registering with the perforations of the other sheet.

Fig. 5 shows circular perforations in one sheet, square perforations in the other.

Fig. 6 shows elongated perforations in both sheets.

In Fig. 7 the bridging sections 11 between narrow slits 12 in one sheet extend across circular sections 13 of the other.

Fig. 8 illustrates a multiple-package double-sheet in which the cells containing the wrapped articles (not shown) are indicated at 14, while between these cells a tearing line is indicated which is weakened by narrow slits 16 in one and square perforations 17 in the other sheet.

In Fig. 9 the perforations 20, 21 are shown as being narrow slits of knife-edge width slightly enlarged at their overlapping ends by small circular holes 22.

As indicated in Fig. 5, the entire sections of both sheets containing the perforations may be left free from cement or glue.

I wish it to be understood that I do not desire to be limited to the details shown and described for obvious modifications will occur to a person skilled in the art.

What I claim is:

1. A multiple package comprising two sheets of plastic material bonded together to form spaced units for receiving packaged articles, each sheet being formed with at least one line of perforations separating the units, said line of perforations consisting of apertures spaced by bridging portions, the apertures of each sheet having a dimension along said line at least equal to the corresponding dimension of the bridging portions of the other sheet, the contacting surfaces of the sheets along the line of perforations and immediately each side thereof being bonded together with the apertures of one sheet aligned and in superposed relation with the bridging portions of the other sheet forming a tearing line between the units having no more than one thickness of material at any given point, whereby the strength of tear is no greater than that of one sheet.

2. A multiple package as defined in claim 1, in which the perforations in at least one of said sheets are in the form of polygons having angles extending in the direction of said lines.

3. A multiple package as defined in claim 1, in which the perforations in at least one of said sheets are in the form of elongated slots.

4. A multiple package as defined in claim 1, in which the sheets are formed of cellulose acetate.

CHARLES NICOLLE.

REFERENCES CITED

The following references are of record in the file of this patent:

UNITED STATES PATENTS

| Number | Name | Date |
|---|---|---|
| 361,603 | Wheeler | Apr. 19, 1887 |
| 1,142,349 | Merrill | June 8, 1915 |
| 1,626,578 | Walters | Apr. 26, 1927 |
| 2,083,617 | Salfisberg | June 15, 1937 |
| 2,197,845 | Ward | Apr. 23, 1940 |
| 2,329,360 | Salfisberg | Sept. 14, 1943 |

FOREIGN PATENTS

| Number | Country | Date |
|---|---|---|
| 488,743 | Great Britain | July 13, 1938 |